United States Patent
Hashimoto et al.

(10) Patent No.: US 12,282,519 B2
(45) Date of Patent: Apr. 22, 2025

(54) RECIPE SEARCH SUPPORT APPARATUS, AND RECIPE SEARCH SUPPORT METHOD

(71) Applicant: Cookpad Inc., Kanagawa (JP)

(72) Inventors: Kenta Hashimoto, Kanagawa (JP); Yu Uno, Kanagawa (JP); Hiroto Igarashi, Kanagawa (JP); Yuji Fujisaka, Kanagawa (JP); Shintaro Morikawa, Kanagawa (JP)

(73) Assignee: COOKPAD, INC., Yokohama (JP)

( * ) Notice: Subject to any disclaimer, the term of this patent is extended or adjusted under 35 U.S.C. 154(b) by 0 days.

(21) Appl. No.: 18/219,730

(22) Filed: Jul. 10, 2023

(65) Prior Publication Data
US 2023/0367830 A1   Nov. 16, 2023

Related U.S. Application Data

(63) Continuation of application No. PCT/JP2021/041679, filed on Nov. 12, 2021.

(30) Foreign Application Priority Data

Feb. 26, 2021   (JP) .................. 2021-030633

(51) Int. Cl.
G06F 16/00        (2019.01)
G06F 16/9538      (2019.01)
G06Q 50/10        (2012.01)

(52) U.S. Cl.
CPC ......... G06F 16/9538 (2019.01); *G06Q 50/10* (2013.01)

(58) Field of Classification Search
CPC ................................... G06F 16/9538
USPC ........................................ 707/722
See application file for complete search history.

(56) References Cited

U.S. PATENT DOCUMENTS

| 11,782,931 B2 * | 10/2023 | Byron ................ A23L 5/10 707/722 |
| 2015/0066909 A1 | 3/2015 | Uchida et al. |
| 2021/0089608 A1 * | 3/2021 | Gohil ............ G06F 16/9538 707/707 |

FOREIGN PATENT DOCUMENTS

| JP | H11-45297 A | 2/1999 |
| JP | 2005-284406 A | 10/2005 |
| JP | 2012-003319 A | 1/2012 |
| WO | 2014/178120 A1 | 11/2014 |

OTHER PUBLICATIONS

International Search Report and Written Opinion mailed on Feb. 8, 2022, received for PCT Application PCT/JP2021/041679, filed on Nov. 12, 2021, 8 pages including English Translation.

* cited by examiner

*Primary Examiner* — Alexandria Y Bromell
(74) *Attorney, Agent, or Firm* — XSENSUS LLP

(57) ABSTRACT

A recipe search support apparatus 10 is provided with: a storage unit 11 to hold recipe information; an information storage unit 100 configured to, when a recipe site receives a use report of a recipe from a user, receive an input of feature information of the recipe and store the feature information in association with the recipe and the use report in the storage unit 11; and an information output unit 101 configured to, when the recipe site receives a recipe search request, search the storage unit 11 for feature information matching a search keyword included in the request and output at least one of a recipe and a use report associated with the feature information.

7 Claims, 12 Drawing Sheets

FIG. 4

Recipe DB 120

| Recipe ID | Genre | Title | Dish details | File name | Use report | Hash tag | ... |
|---|---|---|---|---|---|---|---|
| r001 | Sweets | Fluffy fruit cake | Make a paste of apples and mix it with meringue to make a cake sponge... | 001.dat | R001-01.dat, ... | #baby food #low sugar #hand-held | ... |
| r002 | Japanese food | Everyone's favorite meat and potatoes | Boil 3 potatoes thoroughly... | 002.Dat | — | — | ... |
| r003 | Chinese food | Gentle flavored healthy spring rolls | 150g of crab sticks... | 003.dat | R003-01.dat, ... | #diet #also for baby food #low calorie #box lunch | ... |
| ... | ... | ... | ... | ... | ... | ... | ... |

RECIPE SEARCH SUPPORT APPARATUS, AND RECIPE SEARCH SUPPORT METHOD

CROSS-REFERENCE TO RELATED APPLICATIONS

This application is a Continuation Application of No. PCT/JP2021/041679, filed on Nov. 12, 2021, and the PCT application is based upon and claims the benefit of priority from Japanese Patent Application No. 2021-030633, filed on Feb. 26, 2021, the entire contents of each are incorporated herein by reference.

FIELD

The present disclosure relates to a recipe search support apparatus, a recipe search support method, and a recipe search support program.

BACKGROUND

Not only housewives who cook on a daily basis, but also many others have trouble coming up with a dish to make or its recipe when facing with some kind of cooking opportunity. One solution to such a problem is a service that receives recipe postings from various people regardless of whether they are professional or amateur cooks, and distributes and publishes them on the Internet.

Users seeking recipe information access recipe sites that provide the above service, and view recipes in the genre they need or from their favorite contributors. In addition, the users effectively utilize information of the recipes they have viewed as described above in daily dish selection and cooking.

However, the number of recipes published on such a recipe site is enormous and growing every day. Therefore, each user needs to have an adequate search skill to reach information he/she wants.

As a conventional technique related to a recipe search, for example, WO2014/178120 discloses a technique in which a menu decision support device first searches for a menu recipe based on set conditions of a menu proposal date and proposes the menu recipe to the user, so that the user can easily find a favorite menu recipe while interacting with the menu decision support device without having to consider search conditions himself/herself.

This technique relates to a menu decision support device including an input unit for receiving a user's input operation including condition setting for proposing a menu composed of one or more dishes, a control unit for searching a database for a suitable dish on the basis of the input set condition, an output unit for presenting a search result to the user, and an evaluation input unit for receiving a user's evaluation on the presented dish, wherein the control unit has a function of re-searching for a suitable dish on the basis of the set condition and the user's evaluation.

In addition, Japanese Patent Application Publication No. 2012-3319 discloses a technique for appropriately displaying a dish recipe relating to given ingredients.

This technique relates to a dish recipe information providing device including: a recipe extraction means for extracting a predetermined dish recipe from a storage means for storing dish recipes; an evaluation value determination means for determining an evaluation value of the dish recipe extracted by the recipe extraction means in accordance with the order of given ingredients in an ingredient column for displaying the ingredients of the dish recipe; and a display data generation means for generating display data indicating information of the dish recipe based on the evaluation value determined by the evaluation value determination means.

When users search for recipes on recipe sites, they usually search by keywords. Commonly used keywords are the name or genre of the dish or the name of the main ingredient (e.g., carrots or potatoes).

However, as described above, there are a huge number of recipes. In addition, these recipes are posted by various people and from various points of view, and even when the recipes are related to the same dish, they often have no regularity or consistency in the description or presence or absence of the name of the dish or ingredient, the purpose of use, the assumed scene, etc.

When a search is performed using a keyword relating to a simple event, the recipe indicated by the search result is often difficult for the user who is the searcher to imagine the finished dish or difficult for the user to ascertain important features such as a scene and usage.

In this case, it is difficult for the user to efficiently search for and utilize information that appropriately matches the purpose of use and the use scene. In the first place, it may be impossible to find appropriate information.

Such a situation may lead to a decrease in usability of the recipe site by users, and thereby to a decrease in service satisfaction. Therefore, for service operators and application providers, the above situation is a big problem that cannot be ignored.

BRIEF DESCRIPTION OF THE DRAWINGS

Solution to Problem

FIG. 4 is a diagram showing an example configuration of an image DB in the present embodiment.

DETAILED DESCRIPTION

Figure 1:
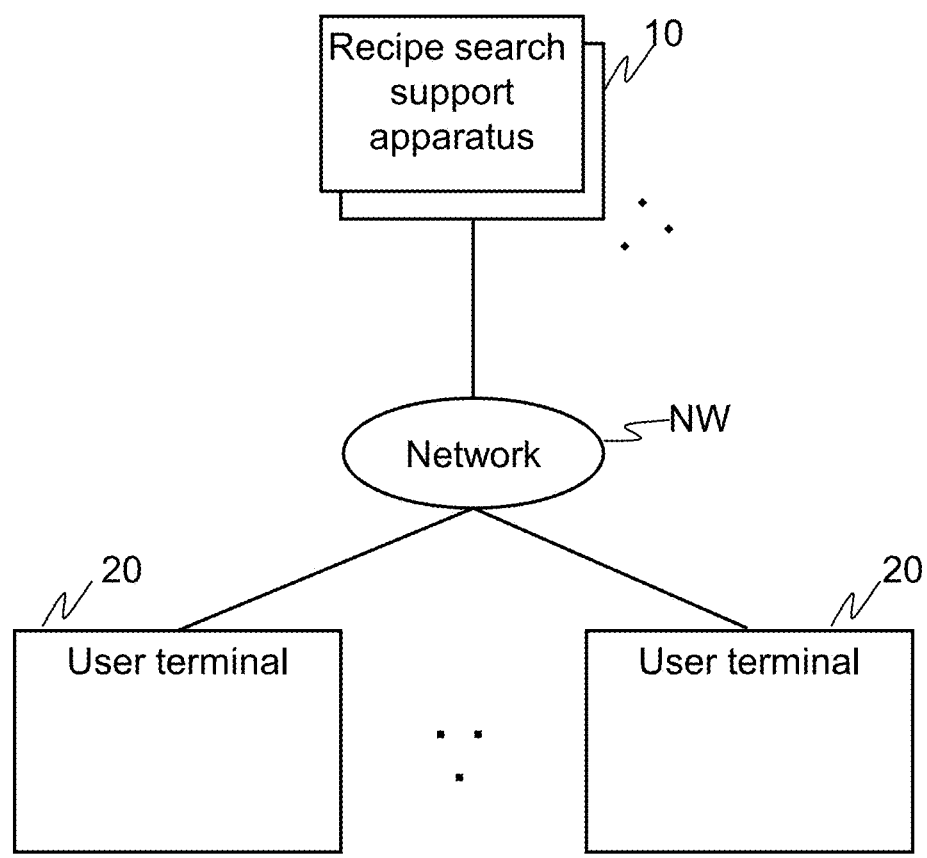
FIG. 1 is a diagram of an example network configuration including a recipe search support apparatus of the present embodiment.

A recipe search support apparatus according to one aspect of the present disclosure is provided with a storage unit to hold recipe information published on a recipe site; an information storage unit configured to, when the recipe site receives a use report of a recipe from a user, receive an input of feature information of the recipe and store the recipe, the use report, and the feature information in the storage unit in association with each other; and an information output unit configured to, when the recipe site receives a recipe search request, search the storage unit for feature information matching a search keyword included in the request and output at least one of a recipe and a use report associated with the feature information.

In a recipe search support apparatus according to one aspect of the present disclosure, the information output unit may generate and output a list of the searched recipe and use report for each piece of the feature information.

In a recipe search support apparatus according to one aspect of the present disclosure, the information output unit may be configured to, when outputting the list of the searched recipe and use report, output the list with the use report arranged in an upper portion of the screen, and the recipe for which the use report was made arranged in a lower portion of the screen.

In a recipe search support apparatus according to one aspect of the present disclosure, the information output unit may be configured to output the feature information in such a manner that the feature information is enumerated horizontally on a screen, above the list of the searched recipe and use report.

In a recipe search support apparatus according to one aspect of the present disclosure, the information output unit may be configured to output the list of recipe and use report associated with a piece of the feature information for which a selection operation by the user is received among the feature information enumerated on the screen.

In a recipe search support apparatus according to one aspect of the present disclosure, the information output unit may be configured to, when a slide operation by the user on the screen is received while the list of the recipe and use report associated with any one piece of the enumerated feature information is being output, cause the screen to transition so as to output the list of the recipe and use report regarding a piece of the feature information adjacent in a direction of the slide operation to the piece of the feature information being output among the enumerated feature information.

In a recipe search support apparatus according to one aspect of the present disclosure, the information output unit may be configured to, when feature information matching the search keyword is not identified as a result of the search, search the storage unit for feature information including a term constituting the search keyword as feature information related to the search keyword, and generate and output a list of at least one of a recipe and a use report associated with the related feature information for each piece of the related feature information.

In a recipe search support method according to one aspect of the present disclosure, an information processing apparatus holds in a storage unit recipe information published on a recipe site; and executes: processing of, when the recipe site receives a use report of a recipe from a user, receiving an input of feature information of the recipe and storing the recipe, the use report, and the feature information in the storage unit in association with each other; and processing of, when the recipe site receives a recipe search request, searching the storage unit for feature information matching a search keyword included in the request and outputting at least one of a recipe and a use report associated with the feature information.

A recipe search support program according to one aspect of the present disclosure causes an information processing apparatus to: hold in a storage unit recipe information published on a recipe site; and execute: processing of, when the recipe site receives a use report of a recipe from a user, receiving an input of feature information of the recipe and storing the recipe, the use report, and the feature information in the storage unit in association with each other; and processing of, when the recipe site receives a recipe search request, searching the storage unit for feature information matching a search keyword included in the request and outputting at least one of a recipe and a use report associated with the feature information.

<Network Configuration Including Recipe Search Support Apparatus>

Hereinafter, an embodiment of the present disclosure will be described with reference to the drawings. FIG. 1 is a diagram of an example network configuration including a recipe search support apparatus 10 and a user terminal 20 of the present embodiment.

The recipe search support apparatus 10 in the present embodiment is a web server itself that publishes a recipe site on a network NW such as the Internet or a server cooperating with the web server. Specific examples of the recipe site include, but are not limited to, a recipe posting site that accepts posting of a recipe created by a user and publishes the recipe, and a general social networking service (SNS).

In any case, it is assumed that the users of the recipe site access the above recipe site by operating the user terminal 20 to post and view recipes and their use reports. Therefore, the concept of the user in the present embodiment includes both a poster who posts recipes, a poster who views and uses such recipes and posts use reports, and a viewer who views those recipes and use reports.

A storage means (storage unit 11 to be described later) of the recipe search support apparatus 10 stores a large number of recipes and their use reports over time. The more enthusiastic the user of the recipe site is, the more the user posts recipes and use reports, and the more the user elaborately searches for and utilizes desired recipes and their use reports from the huge group of recipes thereby formed.

However, even if a recipe search is performed in an environment where the recipe search support technology of the present embodiment is not applied, that is, in a conventional state, only keyword searches based on simple and fixed concepts such as dish names and ingredients used can be performed. Meanwhile, the huge number of recipes are those posted by various users and from various points of view, and even if the recipes are related to the same dish, they often have no regularity or consistency in the description or presence or absence of the name of the dish or ingredient, the purpose of use, the assumed scene, etc.

Therefore, when the simple keyword search as described above is performed, the recipe indicated by the search result is often difficult for the user who is the searcher to imagine the finished dish or difficult for the user to ascertain important features such as a scene and usage.

Therefore, in the present embodiment, the recipe search support technology of the present disclosure is employed to enable users to efficiently search a recipe site for appropriate recipes truly desired by the users.

The user terminal 20 according to the present embodiment may be a smartphone, a tablet terminal, a notebook PC, or the like provided with an appropriate communication function to the network NW. The network NW may be the Internet, a local area network (LAN), or a communication line for short-range wireless communication.

As an example of software held by the user terminal 20, a mobile application that operates on a mobile terminal, i.e., an application is assumed. This application enables viewing of recipes or use reports and a user's posting operation via a browsing function on the recipe site published by the recipe search support apparatus 10.

A person who operates the user terminal 20 accesses the recipe site via the user terminal 20. Then, the person views a desired post or the like and uses it as a reference for his/her own activity. For example, a user refers to recipes and use reports of other users, prepares ingredients necessary for cooking, and cooks by himself/herself.

In addition, such a user uses a report function provided on the recipe site to post a photo or the like stored in the user terminal 20 together with comments in order to report that the user has made a dish based on the recipe the user referred to and whether the recipe is good or bad. Such a post must be accompanied by a photo of the finished dish, which is to be reflected on the page of the recipe with the permission of the recipe author.

<Configuration of Recipe Search Support Apparatus>

Figure 2:
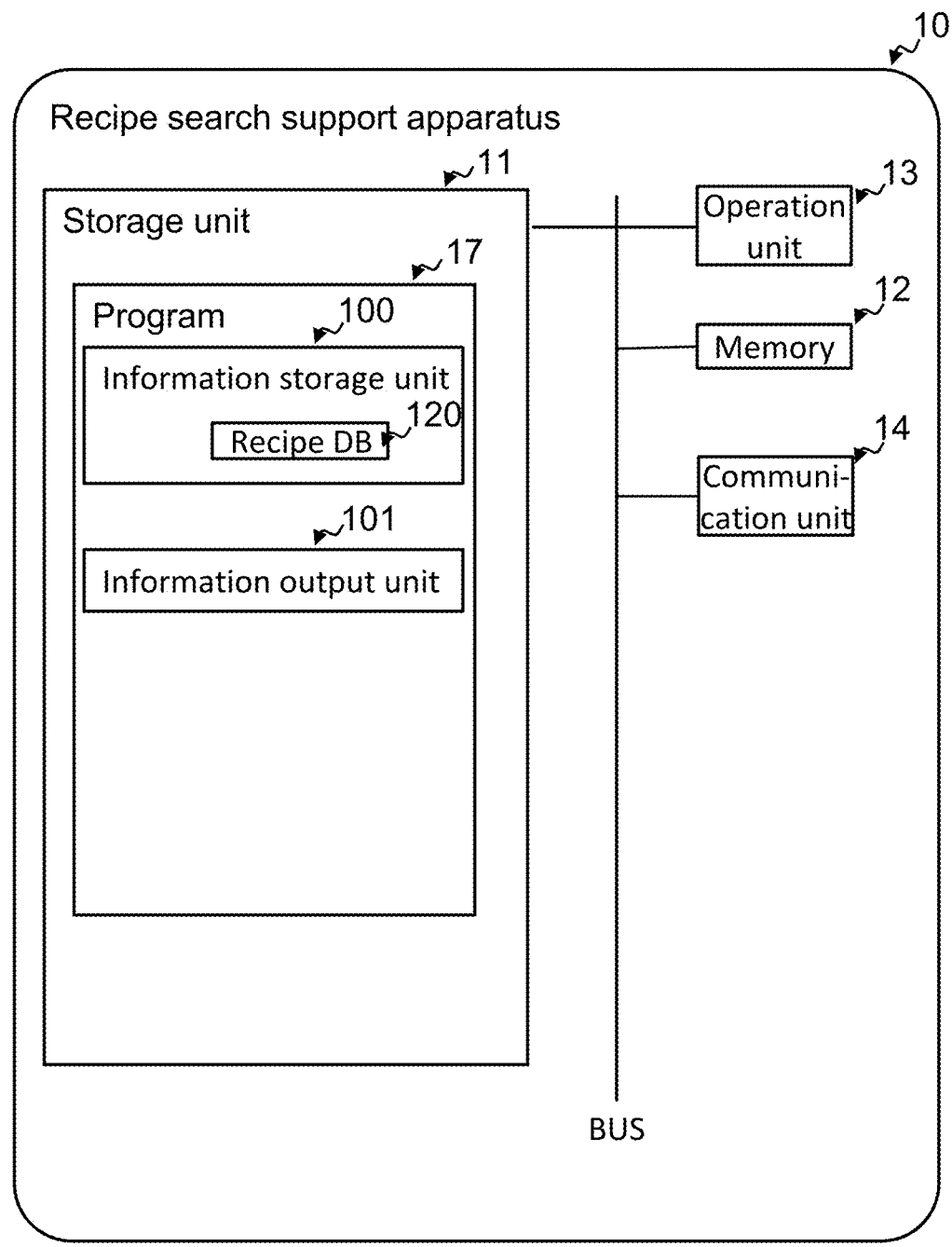
FIG. 2 is a diagram showing an example configuration of the recipe search support apparatus in the present embodiment.

As shown in FIG. 2, the configuration of the recipe search support apparatus 10 in the present embodiment includes a storage unit 11, a memory 12, an operation unit 13, and a communication unit 14.

Among these, the storage unit 11 is composed of a nonvolatile storage element such as a hard disk drive (HDD) or a solid state drive (SSD).

The storage unit 11 stores at least a recipe DB 120 in addition to a program 17 for implementing the functions necessary for the recipe search support apparatus 10 of the present embodiment. Among these, the recipe DB 120 is a database for managing recipes and use reports posted by users, as is natural for the web server of the recipe site.

The memory 12 is composed of a volatile storage element such as a random access memory (RAM). The memory 12 serves as a storage means used when the operation unit 13 reads and executes the program 17 and implements necessary functional units.

Further, assumed as the operation unit 13 is a central processing unit (CPU) that reads the program 17 held in the storage unit 11 into the memory 12 and executes the program 17 to implement the functions necessary for the recipe search support apparatus. The functions implemented here include the functions of an information storage unit 120 and an information output unit 101 to be described later, in addition to the functions of a web server in a general recipe site.

The communication unit 14 is assumed to be a network interface card (NIC) or the like which connects to the network NW and performs communication processing with other devices such as the user terminal 20.

<Configuration of User Terminal>

Figure 3:
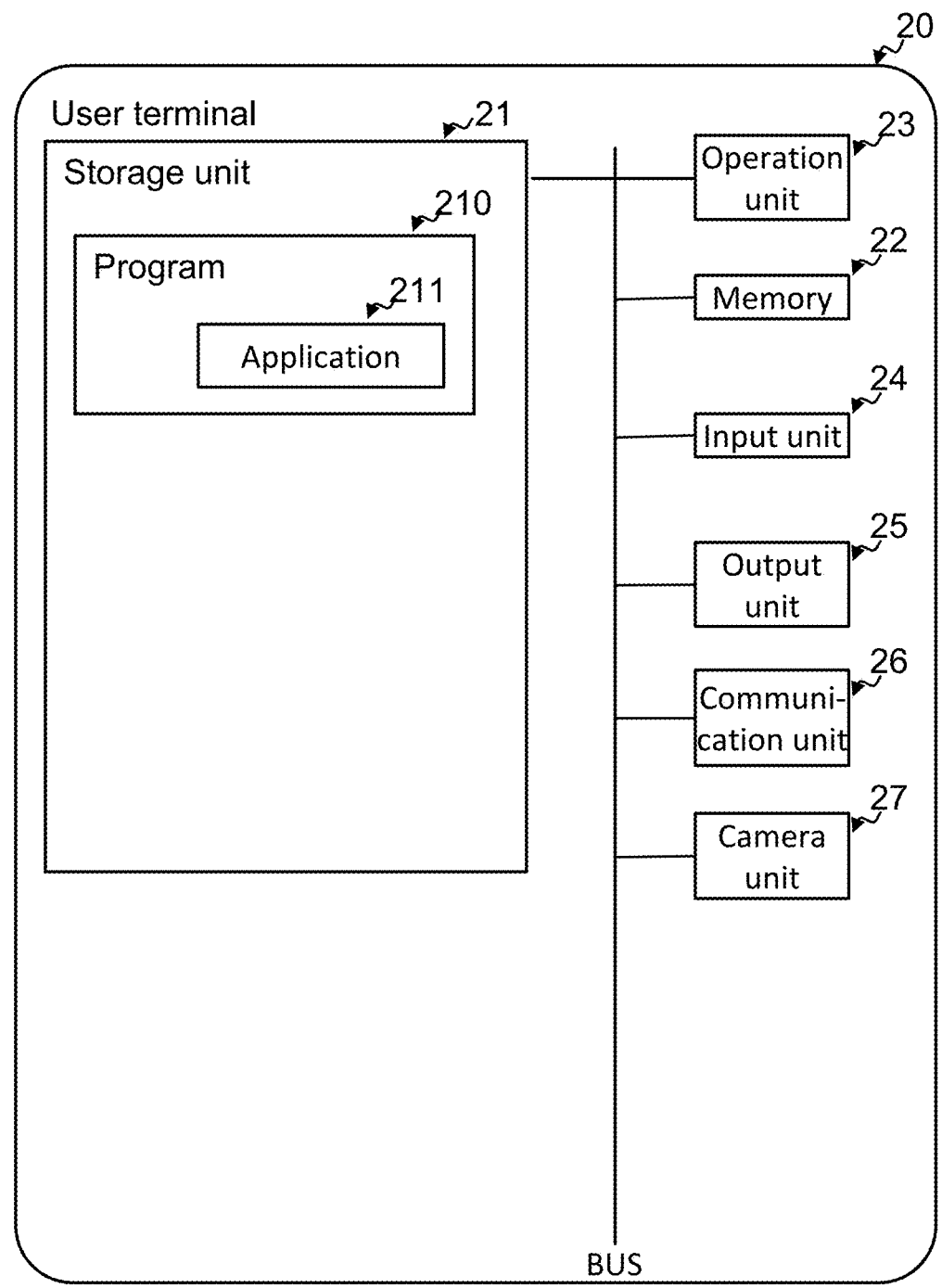
FIG. 3 is a diagram showing an example configuration of a user terminal in the present embodiment.

Next, an example configuration of the user terminal 20 in the present embodiment will be described. FIG. 3 is a diagram showing an example configuration of the user terminal 20 in the present embodiment. As shown in FIG. 3, the user terminal 20 of the present embodiment includes a storage unit 21, a memory 22, an operation unit 23, an input unit 24, an output unit 25, a communication unit 26, and a camera unit 27.

Among these, the storage unit 21 is composed of a nonvolatile storage element such as a hard disk drive (HDD) or a solid state drive (SSD).

In the storage unit 21, at least an application 211 is stored as a program 210 for implementing functions necessary for the user terminal of the present embodiment. As described above, this application 211 enables viewing and posting of a post (including posting of a use report on another person's post) via the browsing function on the recipe site.

The storage unit 21 is provided with a photo folder for storing images captured by the camera unit 27 of the user terminal 20. This photo folder is held in the storage unit 21, and is uploaded to the recipe search support apparatus 10 when a recipe or a use report is posted.

Although not shown, it is assumed that the storage unit 11 stores membership information, which is identification information of the user who owns the user terminal 20. This membership information is issued to a registered user in a membership service provided by the operator of the recipe site, and includes a membership number that uniquely identifies the user, a user attribute, and the like. It should be noted that the memory 22 is composed of a volatile storage element such as a random access memory (RAM).

Further, assumed as the operation unit 23 is a central processing unit (CPU) that reads the program 210 held in the storage unit 21 into the memory 22 and executes the program 210 to implement the functions necessary for the user terminal.

The input unit 24 is assumed to be a keyboard, a mouse, a keypad, a touch panel, a microphone, or the like for receiving a key input or a voice input from the user. The output unit 25 is assumed to be a display or the like for displaying processed data.

The communication unit 26 is assumed to be a network interface card (NIC) or the like which connects to the network NW and performs communication processing with other devices such as the recipe search support apparatus 10.

The camera unit 27 is a digital camera unit generally provided in a smartphone or the like, and is assumed to be a unit for capturing an image of a subject with an optical system in response to receiving an instruction from the user of the user terminal 20 and acquiring data of a photo image, that is, image data. The image data acquired here is stored in the storage unit 21.

<Specific Example of Data>

Next, the database used by the recipe search support apparatus 10 of the present embodiment will be described. FIG. 4 shows an example data configuration of the recipe DB 120 in the present embodiment. The recipe DB 120 is a database storing recipes and their use reports published on the recipe site.

It should be noted that the recipes stored and managed here are not limited to those posted by the user of the user terminal 20, but may be those posted by the operator of the recipe site or parties related thereto, or those posted by cooking experts or restaurants (or chefs thereof) commissioned by the operator of the recipe site.

The structure of the recipe DB 120 in the present embodiment is, for example, a set of records in which a recipe ID uniquely indicating a recipe is stored as a key item, and data such as a dish genre, a title, dish details, a file name (which may be a storage address), a use report, and a hash tag (feature information) assigned to the use report of the recipe are associated with the recipe ID.

Among the above-described data items, the hash tag is received by the recipe search support apparatus 10 from the user terminal 20 that posted the use report, and is feature information assigned by the user in relation to the recipe for which the use report was made. As shown, various kinds of feature information are assumed, such as information indicating the purpose of the dish made based on the recipe, such as "baby food", "diet", "also for baby food", "box lunch", and the like, or information indicating the nature or handling method of the dish made based on the recipe, such as "low sugar", "hand-held", "low calorie", and the like.

<Recipe Search Support Method: Feature Information Acquisition Flow>

Next, an actual procedure of the recipe search support method in the present embodiment will be described with reference to drawings. Various operations corresponding to the recipe search support method to be described below are implemented, for example, by a program executed by the recipe search support apparatus 10 and the user terminal 20. The program is composed of codes for performing various operations to be described below.

Figure 5:
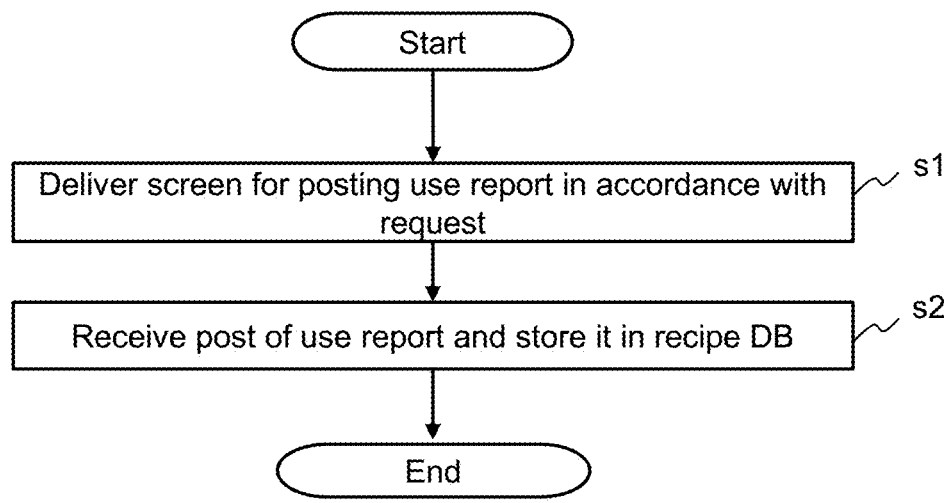
FIG. 5 is a diagram showing an example flow of a recipe search support method in the present embodiment.

FIG. 5 is a diagram showing an example flow of the recipe search support method in the present embodiment. Here, a series of steps relating to generation of the recipe DB 120 in the recipe search support apparatus 10 will be described. However, generation associated with viewing of a recipe on the recipe site and posting of a use report in response to the use of the recipe, not generation associated with posting of a recipe, is assumed.

Figure 6:
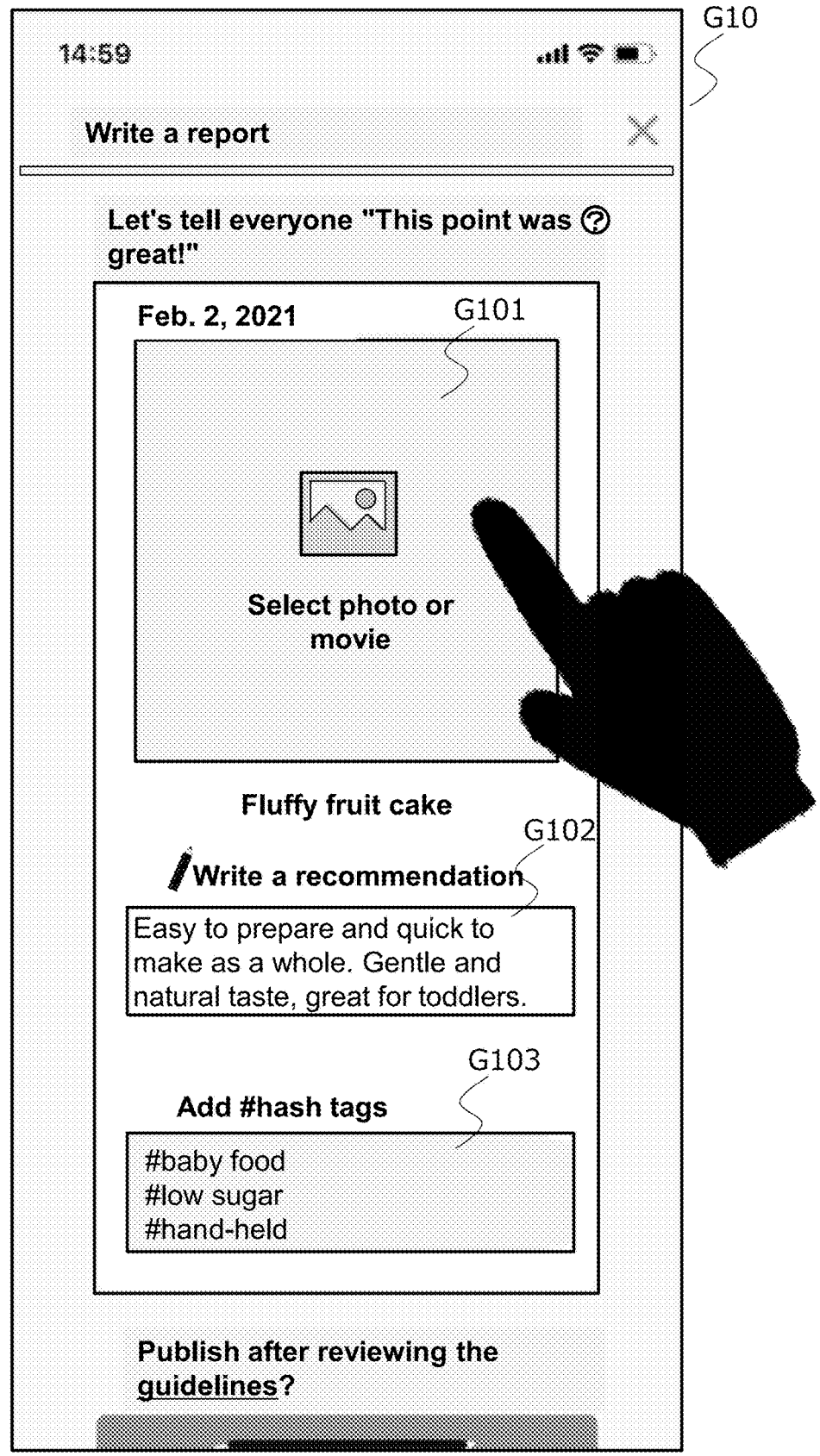
FIG. 6 is a diagram showing an example screen in the present embodiment.

In this case, when the user terminal accesses the recipe site and the information storage unit 100 of the recipe search support apparatus 10 receives a request for posting a use report on a recipe published on the recipe site, the information storage unit 100 delivers a use report posting screen (screen G10 in FIG. 6) to the user terminal 20 (s1).

On the use report posting screen G10, an interface G101 is displayed for uploading, from the storage unit 21 of the user terminal 20, images of ingredients and cooking utensils actually used in cooking by the user who posts the use report, cooking processes, and the finished dish.

The user operates the user terminal 20 and taps the interface G101 to select an appropriate image from the image data held in the storage unit 21 of the user terminal 20. The "write a recommendation" field G102 is an interface for receiving comments such as impressions by the user. Furthermore, a hash tag entry field G103 is an interface for receiving description entries of features of the recipe, recommended purposes of use, and the like that the user feels should be associated with the target recipe as hash tags.

Subsequently, the information storage unit 100 of the recipe search support apparatus 10 acquires the values of the image data, the recommendation, and the hash tags input on the user terminal 20 through the above-mentioned posting screen G10, stores them in the recipe DB 120 (s2), and terminates the processing.

By the above process of s2, values are set in the use report and hash tag columns of the recipe DB 120. In the example of the recipe DB 120 in FIG. 4, the values of the use report "R001-01.dat" and the hash tags "baby food", "low sugar", and "hand-held" are associated with the recipe ID "r001". It is assumed that the file of the use report includes the values of the image uploaded by the poster of the use report, the content entered in the recommendation field, and the hash tags.

<Recipe Search Support Method: Flow of Recipe Search>

Figure 7:
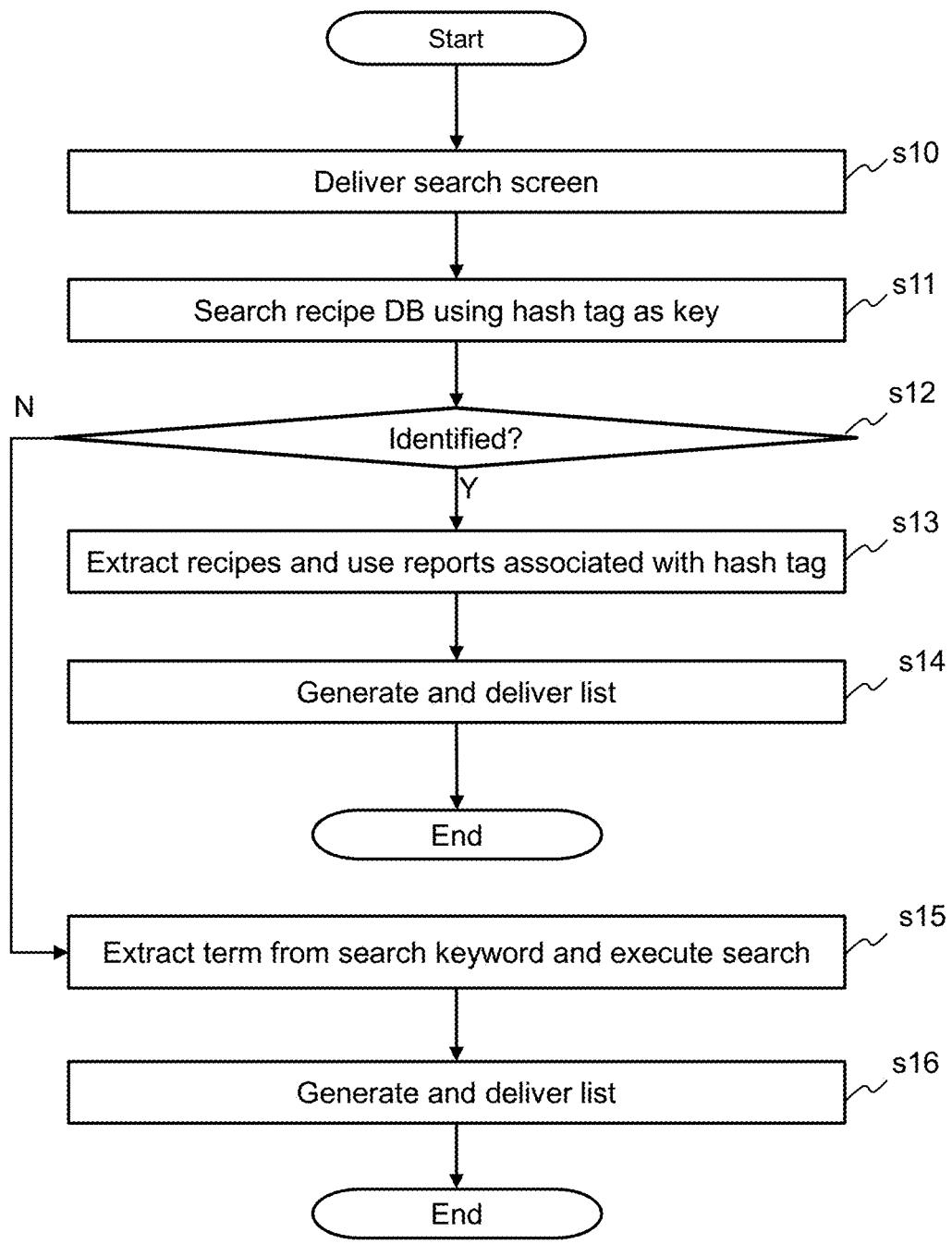
FIG. 7 is a diagram showing an example flow of the recipe search support method in the present embodiment.

FIG. 7 is a diagram showing an example flow of the recipe search support method in the present embodiment. Here, the flow of processing by the information output unit 101 will be described.

In this case, the information output unit 101 of the recipe search support apparatus 10 receives a user's recipe search request in the application 211 of the user terminal 20, and delivers a search screen (see the screen G20 in FIG. 8) (s10).

Figure 8:
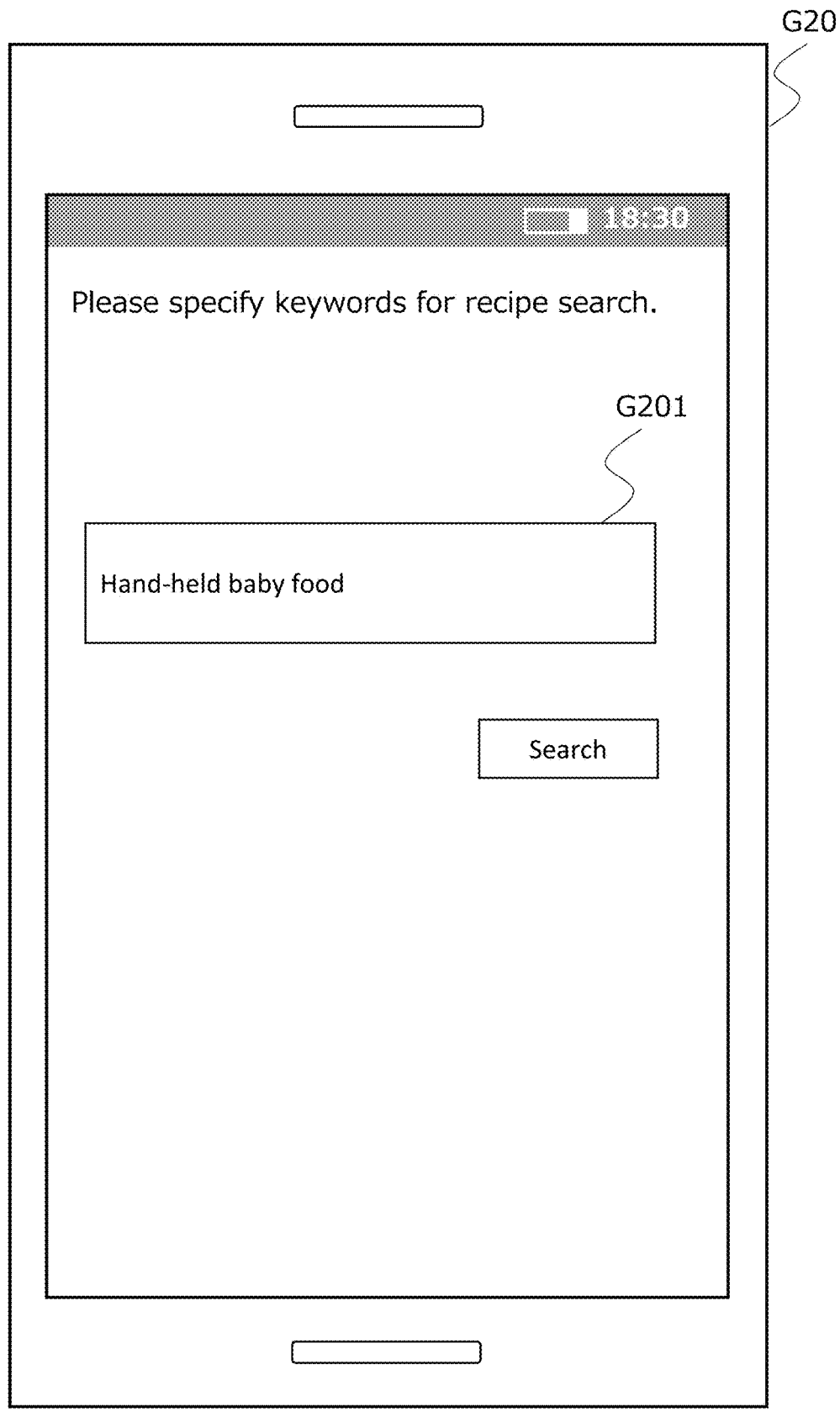
FIG. 8 is a diagram showing an example screen in the present embodiment.

The screen G20 includes at least a search keyword input field G201. The keywords input to the search keyword input field G201 may include not only the dish name, genre, and ingredients used, but also characteristic terms indicating the purpose of use and use situation of the dish desired by the user. In the example of FIG. 8, a state in which the keyword "hand-held baby food" is input is shown.

In other words, the user is a person who is seeking a recipe for baby food that can be eaten by an infant with his/her hands. On the other hand, it can be said that the user is in a state where the specific dish genre, dish name, and ingredients used are unknown or undetermined, and in any case, the user is seeking a wide range of recipes that meet the purpose.

With the conventional recipe search technique, only recipes including the keyword "baby food" in the title are likely to be searched for and presented to the user. On the other hand, the recipe search support apparatus 10 of the present embodiment identifies from the recipe DB 120 and presents recipes or use reports with which the hash tag matching "hand-held baby food" is associated as feature information, or recipes or use reports with which hash tags "baby food" and "hand-held" are associated as feature information.

Subsequently, the information output unit 101 of the recipe search support apparatus 10 acquires the search keyword "hand-held baby food" via the search screen G20 in s10, and searches the recipe DB 120 for a record with which a hash tag (feature information) matching the search keyword is associated (s11).

In the above-described search, when a record with which the hash tag "hand-held baby food" is associated can be identified in the recipe DB 120 (s12: Y), the information output unit 101 extracts at least one of the recipes associated with the hash tag (i.e., feature information) and their use reports from the recipe DB 120 (s13).

The information output unit 101 delivers the list of the recipes and their use reports extracted in s13 to the user terminal 20 (s14), and terminates the processing. As shown by the screen G30 in FIG. 9, this list is output with a list G301 of use reports associated with the hash tag "hand-held baby food" arranged in an upper portion of the screen and a list G302 of recipes for which the use reports were made arranged in a lower portion of the screen.

Figure 9:
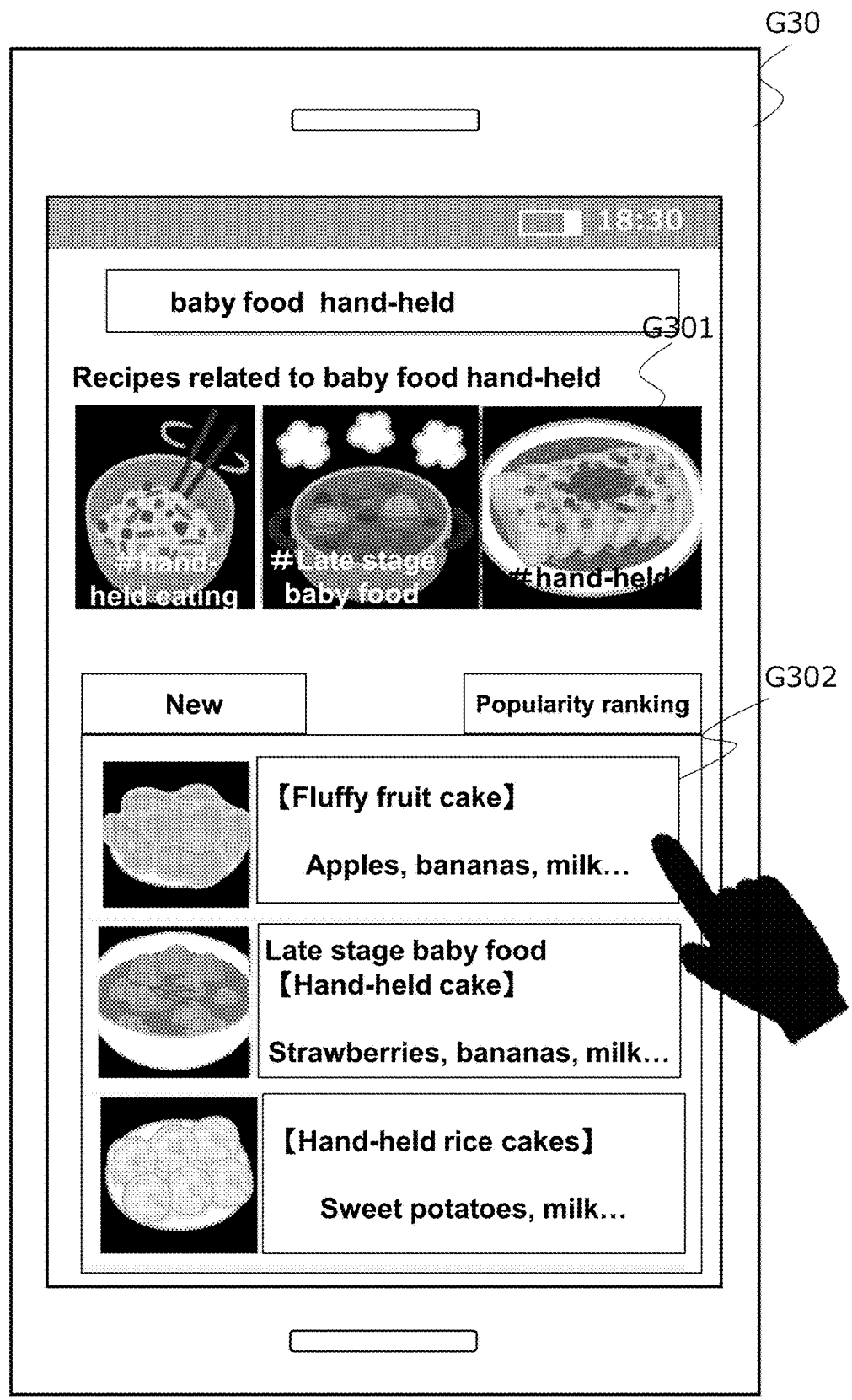
FIG. 9 is a diagram showing an example screen in the present embodiment.

The example of FIG. 9 is a screen when recipes and use reports with which both terms "baby food" and "hand-held" are associated as hash tags are searched for, but for convenience of description, the screen should be read as a screen in which recipes and use reports associated with a hash tag "hand-held baby food" are arranged.

Figure 12:
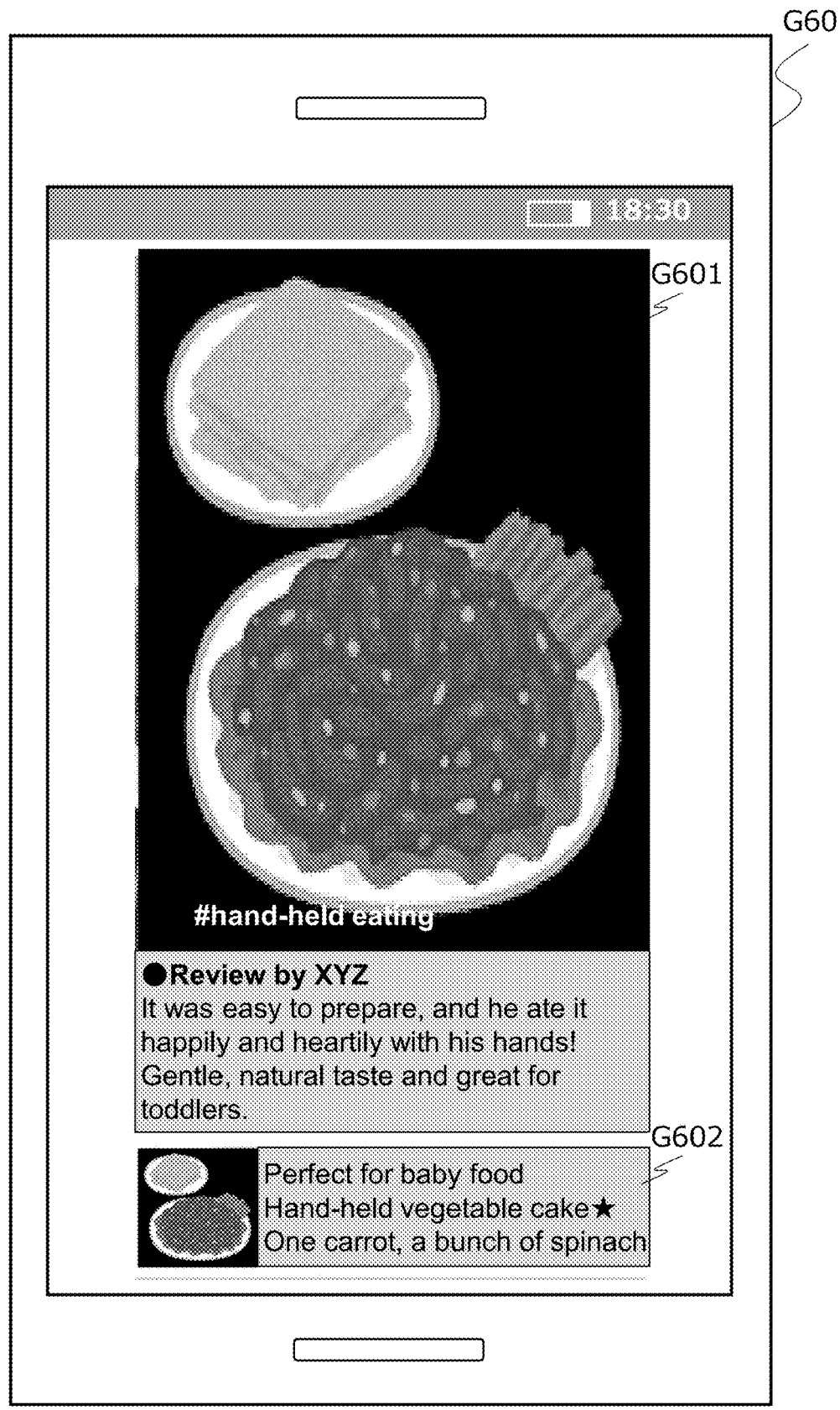
FIG. 12 is a diagram showing an example screen in the present embodiment.

Such an arrangement can also be adopted in a screen configuration that displays one use report and one recipe for which the use report was made, as shown by a screen G60 in FIG. 12.

On the other hand, when the record with which the hash tag "hand-held baby food" is associated cannot be identified in the recipe DB 120 in the above search (s12: N), the information output unit 101 extracts one or more terms from the search keyword by, for example, a morphological analysis algorithm, and searches the recipe DB 120 for hash tags including those terms (s15). In the case of "hand-held baby food", the terms "baby food" and "hand-hold" are extracted, and the above-described search is executed for these terms.

It is assumed that the morphological analysis algorithm is invoked from an external service through the NW, or held available in advance by the information output unit 101.

Subsequently, the information output unit 101 generates a list of at least one of the recipes and the use reports associated with each of the above terms, outputs the list to the user terminal 20 (s16), and terminates the processing. An example of the list in this case is shown on the screen G40 in FIG. 10.

On the screen G40, a list of use reports with which each of the three hash tags G401 to G403 "hand-held eating", "hand-held baby food", and "late stage baby food", which are hash tags including either the term "baby food" or "hand-held", is associated is configured as an image data list G410 of the use reports.

Figure 10:
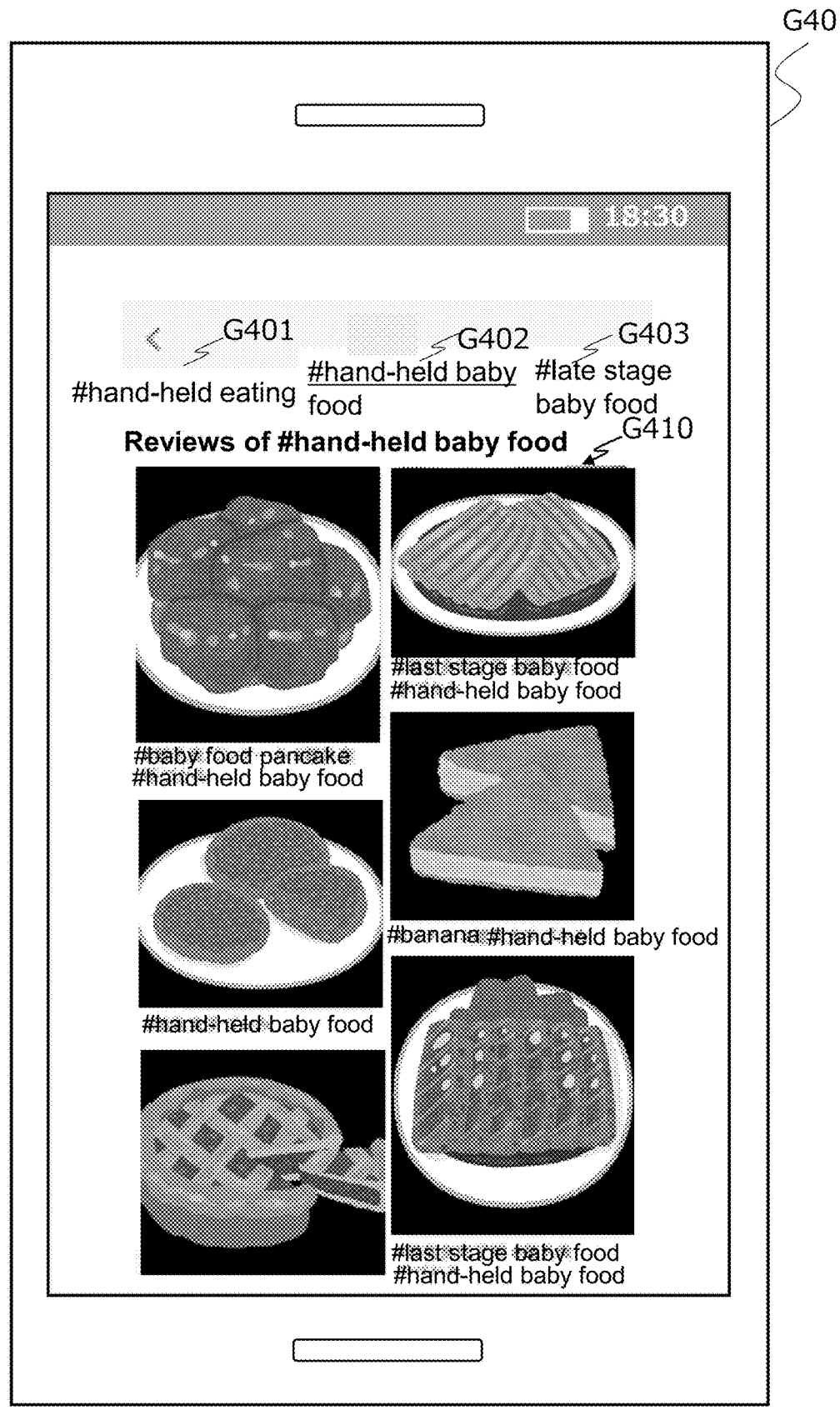
FIG. 10 is a diagram showing an example screen in the present embodiment.

FIG. 10 shows an example also including a state in which a hash tag "hand-held baby food" is identified. Therefore, instead of the screen G30 in FIG. 9, the screen G40 may be delivered in s15.

In the state of the screen G40 in FIG. 10, an image data list G410 of the use reports associated with the hash tag "hand-held eating" G401 is displayed. Under each use report, in addition to "hand-held eating", the value of another hash tag G405 associated with the use report is also arranged, so as to clearly indicate the features of the recipe which the use report is about. Of course, the information output unit 101 extracts the value of such a hash tag from the hash tag column of the recipe DB 120.

As shown by the screen G40 in FIG. 10, the information output unit 101 outputs the hash tags G401 to G403 in such a manner that they are enumerated horizontally on the screen, above the image data list G410 of the use reports (and/or recipes) associated with the hash tag.

The three hash tags G401 to G403 "hand-held eating", "hand-held baby food", and "late stage baby food" are displayed in a selectable manner. Furthermore, the image data list G410 is displayed in a form that accepts a slide operation to the left and right on the screen.

Therefore, for example, when a touch operation, i.e., a selection operation, is performed on an image to which the hash tags "toddler food" and "hand-held eating" are attached among the images of the use reports included in the image data list G410, the information output unit 101 reads from the recipe DB 120 the information of the selected use report and the information of the recipe for which the use report was made and delivers the information to the user terminal 20.

Figure 11:
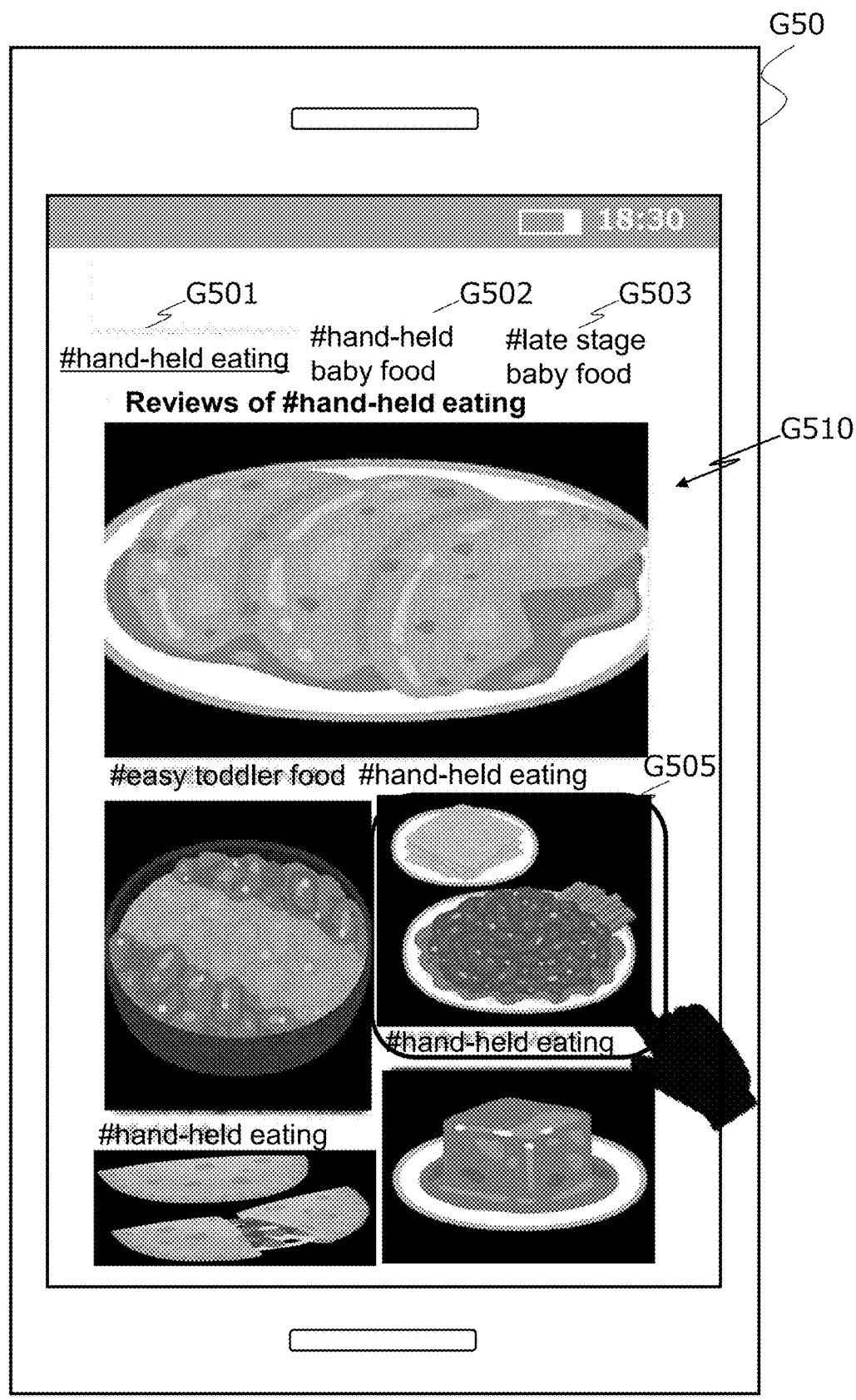
FIG. 11 is a diagram showing an example screen in the present embodiment.

The screen G50 on the user terminal 20 at that time is illustrated in FIG. 11. As shown here, on the screen G50, the information of the use report is arranged in an upper portion, and the information of the recipe for which the use report was made is arranged in a lower portion.

Upon receipt of a slide operation in, for example, the left direction of the right and left directions of the image data list G410 (or the portion where the hash tags G401 to G403 are enumerated) on the screen G40, the information output unit 101 causes the screen to transition to output an image list G510 of the use reports regarding the hash tag "hand-held eating" adjacent in the left direction to the "hand-held baby food", which is the hash tag corresponding to the image data list G410 being output before the slide operation, among the hash tags G401 to G403 enumerated, as shown by the screen G50 in FIG. 11. Of course, together with the image list G510 of the use reports, a list of recipes for which the use reports were made may be displayed.

Upon receipt of a user's selection operation on the image G505 to which the hash tags "toddler food" and "hand-held eating" are attached in the image list G510, the information output unit 101 extracts from the recipe DB 120 the use report corresponding to the image G505 and the information of the recipe for which the use report was made, delivers the use report and the information to the user terminal 20 as the screen 60 in FIG. 12, and terminates the processing.

While the best mode and the like for carrying out the present disclosure has been specifically described above, the present disclosure is not limited thereto, and various modifications can be made without departing from the gist thereof. According to the present embodiment, the user can efficiently search for recipes of their own interest. In addition, it is possible to provide an interface that enables cross-search and display of contents associated with hash tags (e.g., no sugar, etc.) related to one theme (e.g., banana). Consequently, it is possible to efficiently search a recipe site for appropriate recipes truly desired by the user.

The recipe search support method of the present embodiment may be achieved by recording a program for implementing each function constituting the recipe search support apparatus on a computer-readable recording medium, and causing a computer system to read the program recorded on the recording medium to give instructions to the computer system.

Specifically, the program is a program for achieving, by a computer, the operations, in an information processing device, of holding in a storage unit recipe information published on a recipe site; and executing: processing of, when the recipe site receives a use report of a recipe from a user, receiving an input of feature information of the recipe and storing the recipe, the use report, and the feature information in the storage unit in association with each other; and processing of, when the recipe site receives a recipe search request, searching the storage unit for feature information matching a search keyword included in the request and outputting at least one of a recipe and a use report associated with the feature information.

The term "computer system" used here includes hardware such as an OS and peripheral devices. The term "computer-readable recording medium" refers to a portable medium such as a flexible disk, a magneto-optical disk, a ROM, a CD-ROM, a USB memory, or a storage device such as a hard disk or an SSD built into a computer system.

Further, the "computer-readable recording medium" may include a medium which dynamically holds a program for a short time, such as a communication line in the case of transmitting the program via a network such as the Internet or a communication line such as a telephone line, and a medium which holds the program for a certain time, such as a volatile memory in a computer system serving as a server or a client in that case.

In addition, the above-mentioned program may be a program for implementing a part of the above-mentioned functions, or may be a program capable of implementing the above-mentioned functions in combination with a program already recorded in the computer system.

EXPLANATION OF REFERENCE NUMERALS

10: recipe search support apparatus
11: storage unit
12: memory
13: operation unit
14: communication unit
17: program
100: information storage unit
101: information output unit
120: Recipe DB
20: User terminal
21: storage unit
22: memory
23: operation unit
24: input unit 25: output unit
26: communication unit
27: camera unit
211: application

The invention claimed is:

1. A recipe search support apparatus, comprising:
a memory with instructions thereon, the memory holding recipe information published on a recipe site; and
a processor configured to execute the instructions to:
receive a use report of a recipe published on the recipe site from a user in response to use of the recipe;
receive an input of feature information including a hash tag related to the recipe;
store the recipe, the use report, and the feature information in the memory in association with each other;
receive a recipe search request including a search keyword;
search the memory for particular feature information including a particular hash tag matching the search keyword;
when the search identifies at least one recipe and use report stored in the memory as being associated with the particular feature information including the particular hash tag matching the search keyword, generate and output a first list including the at least one recipe and use report; and
when the search does not identify at least one recipe and use report stored in the memory as being associated with the particular feature information including the particular hash tag matching the search keyword:
further search the memory with a morphological analysis algorithm for feature information including a hash tag morphologically related to the search keyword, and
generate and output a second list including at least one of a recipe and a use report associated with the feature information including the hash tag morphologically related to the search keyword.

2. The recipe search support apparatus according to claim 1, wherein the processor is further configured to output the first list such that the use report is arranged in an upper portion of a screen and the at least one recipe arranged in a lower portion of the screen.

3. The recipe search support apparatus according to claim 1, wherein the processor is further configured to output the feature information enumerated horizontally on a screen and above the first list.

4. The recipe search support apparatus according to claim 3, wherein the processor is further configured to output the first list associated with a piece of the feature information, for which a selection operation by the user is received among the feature information, enumerated on the screen.

5. The recipe search support apparatus according to claim 3, wherein the processor is further configured to, when a slide operation by the user on the screen is received while the first list associated with a first piece of the enumerated feature information is output, control display of the screen to transition so as to output the first list regarding a second piece of the feature information adjacent in a direction of the slide operation to the first piece of the feature information output among the enumerated feature information.

6. A recipe search support method, comprising:
storing, in a memory, recipe information published on a recipe site;
receiving a use report of a recipe published on the recipe site from a user in response to use of the recipe;
receiving an input of feature information including a hash tag related to the recipe;
storing the recipe, the use report, and the feature information in the memory in association with each other;
receiving a recipe search request including a search keyword;
searching the memory for particular feature information including a particular hash tag matching the search keyword;
when the searching identifies at least one recipe and use report stored in the memory as being associated with the particular feature information including the particular hash tag matching the search keyword, generating and outputting a first list including the at least one recipe and use report; and
when the searching does not identify at least one recipe and use report stored in the memory as being associated with the particular feature information including the particular hash tag matching the search keyword:
further searching the memory with a morphological analysis algorithm for feature information including a hash tag morphologically related to the search keyword; and
generating and outputting a second list including at least one of a recipe and a use report associated with the feature information including the hash tag morphologically related to the search keyword.

7. A non-transitory computer-readable recording medium storing computer executable instructions which, when executed by a processor of an information processing apparatus, cause the information processing apparatus to:
store, in a memory, recipe information published on a recipe site;
receive a use report of a recipe published on the recipe site from a user in response to use of the recipe;
receive an input of feature information including a hash tag related to the recipe;
storing the recipe, the use report, and the feature information including a particular hash tag in the memory in association with each other;
receive a recipe search request including a search keyword;
search the memory for particular feature information including a particular hash tag matching the search keyword;
when the search identifies at least one recipe and use report stored in the memory as being associated with the particular feature information including the particular hash tag matching the search keyword, generate and output a first list including the at least one recipe and use report; and
when the search does not identify at least one recipe and use report stored in the memory as being associated with the particular feature information including the particular hash tag matching the search keyword:
further search the memory with a morphological analysis algorithm for feature information including a hash tag morphologically related to the search keyword, and
generate and output a second list including at least one of a recipe and a use report associated with the feature information including the hash tag morphologically related to the search keyword.

* * * * *